United States Patent Office — 2,912,417, Patented Nov. 10, 1959

2,912,417
1,3 DIENE, METHOD OF MAKING SAME, AND POLYMER THEREOF

John J. Drysdale, Clifton Park Manor, Del., assignor to E. I. du Pont de Nemours and Company, Wilmington, Del., a corporation of Delaware No Drawing. Application June 25, 1956
Serial No. 593,354

13 Claims. (Cl. 260—82.3)

This invention relates to unsaturated organic compounds. More particularly, it relates to certain substituted 1,3-dienes, and to a method for their preparation.

1,3-dienes are useful in a variety of applications. They can be polymerized, either alone or with other copolymerizable ethylenic compounds, to polymers that are the synthetic rubbers of commerce. A variety of 1,3-diene polymers are used in various specific applications since particular properties of the polymer depend on the particular substituents in the 1,3-dienes.

This invention has as an object the preparation of new 1,3-dienes. A further object is the preparation of polymers, including copolymers, of these dienes. A further object is the provision of new coating compositions containing the polymers of the present invention in solution in a volatile organic solvent. Other objects will appear hereinafter.

These objects are accomplished by the present invention of 1,3-dienes having a cyanoalkyl or carbomethoxyalkyl group attached to the carbon in the 3-position. A further aspect of the present invention is that of polymers, including copolymers with one or more monoethylenically unsaturated polymerizable compounds and/or polymerizable dienes. Still another aspect of the present invention is the process whereby the new 1,3-dienes of this invention are prepared by heating, to a temperature of 550° C. to 850° C., and preferably 600–700° C., under a pressure of less than one atmosphere, and preferably at a pressure of 1–50 mm. mercury, a methylenecyclobutane having only hydrogen on one of the annular carbons adjacent to the annular carbon to which the methylene, =CH₂, group is attached, having on the other carbon adjacent to the methylene-bearing carbon an alkyl group of up to six carbons and having hydrogen on the carbon bearing the free valence, i.e., a primary or secondary alkyl group of up to six carbons, the remaining valence on the said second adjacent annular carbon being satisfied by hydrogen or by an alkyl group of up to six carbons, and the remaining, fourth, annular carbon bearing at least one nitrile or carbomethoxy group, the remaining valence on the fourth annular carbon being satisfied by hydrogen, an alkyl group of up to six carbon atoms, phenyl, nitrile or carbomethoxy.

The 1,3-dienes of this invention and their preparation from the appropriate methylenecyclobutane are illustrated by the following equation:

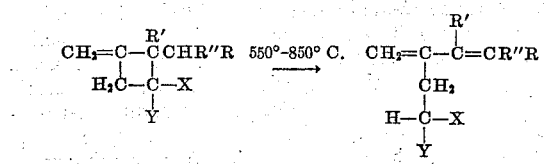

wherein R and R'' are hydrogen or alkyl groups in which R+R'' total up to five carbons, R' is hydrogen or an alkyl group of up to six carbons, X is nitrile, —CN, or carbomethoxy, —COOCH₃, and Y is hydrogen, alkyl of up to six carbons, phenyl or X. Particularly preferred are the 1,3-butadienes having a terminal methylene group and on carbon attached to said methylene group an ethyl group which has one to two cyano groups on the β-carbon, any other substituent on butadiene carbon being alkyl of up to six carbons and on carbon of the ethyl group being aliphatically saturated hydrocarbon of up to six carbon, i.e., hydrocarbon of up to six carbons and free from non-aromatic unsaturation.

The process of this invention is preferably carried out by passing the substituted methylenecyclobutane reactant through a reaction zone heated at 600°–700° C. under a pressure of 1–50 mm. mercury. Operating temperatures of 600–700° C. are preferred since lower temperatures give poorer yields of the 1,3-dienes, while temperatures above 750° C. tend to cause the formation of larger quantities of undesired by-products. Although the contact time of the methylenecyclobutane reactant at the pyrolysis temperature is not critical, it is preferred to use a short contact time in order to obtain optimum yields of the 1,3-dienes of this invention. Low operating pressures, i.e., 1–50 mm. mercury, are preferred since they permit more rapid passage of the reactants through the heated reaction zone. It is also preferred to cool the reaction mixture rapidly after it leaves the pyrolysis zone. This is conveniently done by immediately passing the reaction mixture through a trap cooled to low temperature, e.g., a trap cooled by liquid nitrogen. This permits the maintenance of the reaction zone at the desired low operating pressure by rapidly condensing low boiling by-products formed during the pyrolysis. This rapid cooling also improves the yield of monomeric 1,3-diene by suppressing the polymerization of the Diels-Alder condensation of the 1,3-dienes formed in the reaction mixture.

The reactor in which the substituted methylenecyclobutane is pyrolyzed can be constructed of any inert heat-resistant material. For example, the reactor can be made of quartz, heat-resistant glass, stainless steel or other inert metal. The reactor can, if desired, be packed with inert material, e.g., granular quartz, to provide better heat transfer. The reaction zone can be heated by conventional means. Electric heaters are very satisfactory for this purpose.

A specific type of reactor which is satisfactory in carrying out the process of this invention consists of a vertical cylindrical reaction tube approximately 1″ in diameter and 12″ long made of quartz or of a heat-resistant glass, e.g., the type of glass known commercially as "Vycor." The reaction tube is packed with 6 mm. sections of quartz tubing 6 mm. in diameter and is heated externally by means of a cylindrical electric furnace. The temperature of the reaction zone is recorded by a thermocouple placed in the center of the reaction tube. A high-capacity vacuum pump maintains the reaction system at the desired reduced pressure. Pressures down to a few microns of mercury can be obtained by the use of a mercury diffusion pump. In this apparatus, the pressure is measured between the pump and the cold trap in which the pyrolysis products are collected. The cold trap is cooled by liquid nitrogen. The substituted methylenecyclobutane reactant is gradually introduced into the reaction zone by conventional means, e.g., by means of a dropping funnel or by distillation.

The substituted methylenecyclobutane reactants for use in the process of this invention can be prepared by heating, in the absence of a polymerization initiator, and preferably in the presence of a polymerization inhibitor, e.g., hydroquinone, phenothiazine, copper resinate, the naphthylamines and β-naphthol and at a temperature of 150–250° C., a mixture of (a) an allene having the formula

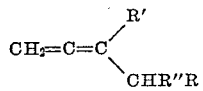

wherein R' is hydrogen or an alkyl group of up to six carbon atoms, and R and R" are hydrogen or alkyl groups in which R and R" total up to five carbons, e.g., 1,1-diethylallene, 1,1-dimethylallene, 1-methylallene, 1,1-di-n-hexylallene, 1-isopropylallene, 1,1-di-(1-methylpropyl)-allene and (b) a vinylidene compound $H_2C=CXY$, wherein X is a nitrile or carbomethoxy group and Y is hydrogen, alkyl of up to six carbons, phenyl or X, e.g., acrylonitrile, methacrylonitrile, α-ethylacrylonitrile, methylacrylate, methyl methacrylate, α-phenylacrylonitrile, α-cyclohexylacrylonitrile, methyl α-phenylacrylate, and dimethyl methylenemalonate. This process is described in greater detail in U.S. application Serial No. 532,376, filed September 2, 1955, by H. N. Cripps.

While the preferred process of making the 1,3-dienes of this invention consists in heating a substituted methylenecyclobutane of the type defined previously, the 1,3-dienes can also be prepared directly from allenes and suitably substituted ethylenic compounds. In this alternative process, illustrated in Example IV below, a mixture of an allene

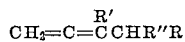

as above formulated and a vinylidene compound $H_2C=CXY$ as above formulated is heated to a temperature of at least 550° C., and preferably at 600–700° C., preferably at atmospheric or slightly reduced pressure, e.g., pressures of 300 mm. Hg to 1 atmosphere. The reaction time is not critical in this alternative process. However, short contact times are preferred since they tend to suppress side reactions and it is economically undesirable to heat the reaction mixture for a longer time than necessary. Similarly, the rate of cooling the reaction mixture from reaction temperature is not critical. However, rapid cooling is preferred since it improves the yield of the desired 1,3-diene and suppresses the polymerization of the diene and the formation of Diels-Alder condensation products. Satisfactory results are obtained in this alternative process when the reaction products are cooled in traps containing a mixture of solid carbon dioxide and acetone as the coolant. This alternative process can be carried out in the same type of equipment as described previously.

The allenes and vinylidene compoundns used as reactants in this alternative process can be the grades commercially available for use in polymerization. Best results are obtained when the allenes are relatively pure.

The products and process of this invention are illustrated in further detail in the following examples in which proportions are expressed in parts by weight unless otherwise specified.

Example I

A vertical cylindrical tube of the type described above is heated to 650° C. and maintained at a pressure of 1–2 mm. mercury. Fifty grams of 2,2-dimethyl-3-cyano-1-methylenecyclobutane is passed gradually through the heated tube during a period of 30 minutes. The reaction product is collected in a U-trap which is chilled by a bath of liquid nitrogen. At the end of the reaction the trap is removed from the system and the gaseous products are allowed to evaporate at room temperature. The remaining liquid is distilled through a fractionating column and there is obtained 10 ml. of 2-methyl-3-(2-cyanoethyl)-1,3-butadiene boiling at 125–126° C./80 mm. and having a refractive index, $n_D^{25}$, of 1.4800–1.4810.

Analysis.—Calculated for $C_8H_{11}N$: C, 79.28%; H, 9.15%. Found: C, 79.90%, 79.85%; H, 9.15%, 8.93%.

The structure of this product is determined by infrared and nuclear magnetic resonance analyses, and is confirmed by reaction with maleic anhydride at 25° C. (exothermic reaction) to give the Diels-Alder adduct

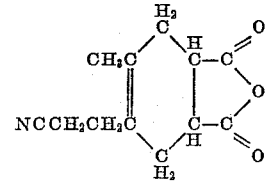

4-(2-cyanoethyl)-5-methyl-4-cyclohexene-1,2-dicarboxylic anhydride melting at 95–96° C.

Analysis.—Calculated for $C_{12}H_{13}NO_3$: C, 65.74%; H, 5.98%. Found: C, 65.91%; H, 6.06%.

The starting 2,2-dimethyl-3-cyano-1-methylenecyclobutane not converted to 2-methyl-3-(2-cyanoethyl)-1,3-butadiene in Example I is cleaved to 1,1-dimethylallene and acrylonitrile. These cleavage products can be recovered and reconverted to 2,2-dimethyl-3-cyano-1-methylenecyclobutane by heating to 150°–250° C. in the presence of a polymerization inhibitor.

Example II

A reaction tube of the type used in the preceding example is heated to 650° C. and 3 mm. mercury pressure. To this hot tube is added 35 g. of 2,2,3-trimethyl-3-cyano-1-methylenecyclobutane during a period of 20 minutes. At the end of the reaction the reaction product isolated in the cold trap is worked up as described in Example I. On distillation, there is obtained 7 g. of 2-methyl-3-(2-cyanopropyl)-1,3-butadiene, boiling at 98° C./22 mm. and having a refractive index, $n_D^{27}$, of 1.4680.

Analysis.—Calculated for $C_9H_{13}N$: C, 79.93%; H, 9.69%. Found: C, 79.83%; H, 9.86%.

The structure of the product is determined by infrared and nuclear magnetic resonance analyses.

Example III

A glass tube is charged with 0.01 g. of azobisisobutyronitrile and 1 ml. of the 2-methyl-3-(2-cyanopropyl)-1,3-butadiene of Example II. The tube is cooled until the monomer has solidified and is then evacuated and sealed. The sealed tube is heated at 65–70° C. for 24 hours. At the end of this period the reaction mixture is very viscous. After cooling to room temperature, the tube is opened and the polymeric product is washed with benzene to remove monomer and low molecular weight polymer. The solid residue is dried under reduced pressure and there is obtained a 50% yield of solid polymer of 2-methyl-3-(2-cyanopropyl)-1,3-butadiene.

Example IV

A mixture of of 100 g. of acrylonitrile and 50 g. of 1,1-dimethylallene is dropped through a reaction tube maintained at 600° C. and 1 atmosphere pressure over a period of 150 minutes. The reaction mixture is then collected in a cold trap as in the preceding examples. The product is fractionally distilled and, after recovering some unreacted starting materials, there is obtained 7 g. of crude 2-methyl-3-(2-cyanoethyl)-1,3-butadiene boiling at 124–128° C./80 mm. and having a refractive index, $n_D^{27}$, of 1.4780. This crude diene is reacted with 5 parts of maleic anhydride at 25° C. (exothermic reaction) and the resulting Diels-Alder adduct, 4-(2-cyanoethyl)-5-methyl-4-cyclohexene-1,2-dicarboxylic anhydride, is purified by recrystallization from a mixture of benzene and cyclohexane. The recrystallized product has a melting point of 95–97° C. Infrared analysis of this material shows that it is identical with the Diels- Alder adduct of the 2-methyl-3-(2-cyanoethyl)-1,3-butadiene of Example I.

The examples have illustrated the invention in its monomer, polymer, and process aspects in its application to the formation of certain 1,3-dienes and of a polymer therefrom. The invention is however generic to 1,3-dienes of the formula

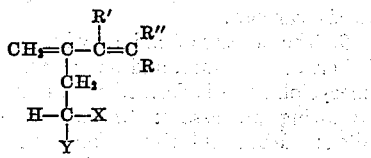

wherein R and R'' are hydrogen or alkyl groups in which R and R'' total up to five carbons, R' is hydrogen or an alkyl group of up to six carbons, X is —CN or —CO₂CH₃, and Y is hydrogen, alkyl of up to six carbons, phenyl, or X, to polymers thereof, including copolymers with monoethylenically unsaturated polymerizable compounds, e.g., acrylonitrile, methyl methacrylate, styrene, etc., and polymerizable dienes, e.g., butadiene, chloroprene, etc., to the preparation of the monomers by the pyrolysis of methylene cyclobutanes of the formula

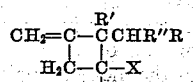

wherein R, R', R'', X, and Y are as above, or by heating a mixture of an allene of the formula

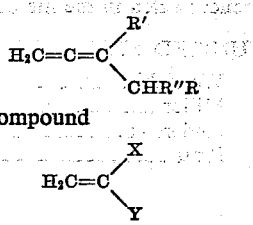

and a vinylidene compound $$H_2C=C\begin{matrix}X\\Y\end{matrix}$$

wherein R, R', R'', X, and Y are as defined immediately above. Thus, by pyrolysis in the manner set forth above 2-(2-cyanoethyl)-1,3-butadiene is obtained from 2-methyl-3-cyano-1-methylenecyclobutane;

2-(2-cyanoethyl)-3-n-butyl-1,3-heptadiene is obtained from 2,2-di-n-butyl-3-cyano-1-methylenecyclobutane;

2-(2-cyanoethyl)-3-ethyl-1,3-pentadiene is obtained from 2,2-diethyl-3-cyano-1-methylenecyclobutane;

2-(2-cyanoethyl)-2-n-hexyl-1,3-nonadiene is obtained from 2,2-di-n-hexyl-3-carbomethoxy-1-methylenecyclobutane;

2-(2-carbomethoxyhexyl)-1,3-heptadiene is obtained from 2,3-di-n-butyl-3-carbomethoxy-1-methylenecyclobutane;

2-(2-carbomethoxyoctyl)-3-methyl-1,3-butadiene is obtained from 2,2-dimethyl-3-hexyl-3-carbomethoxy-1-methylenecyclobutane;

2-(2,2-dicarbomethoxyethyl)-1,3-butadiene is obtained from 2-methyl-3,3-dicarbomethoxy-1-methylenecyclobutane;

2-(2,2-dicyanoethyl)1,3-butadiene is obtained from 2-methyl-3,3-dicyano-1-methylenecyclobutane; and 2-(2-cyano-2-phenylethyl)-3-methyl-1,3-butadiene is obtained from 2,2-dimethyl-3-cyano-3-phenyl-1-methylenecyclobutane.

The monomeric, 1,3-dienes of this invention are useful in various applications. They are especially useful for polymerization, alone or with other copolymerizable ethylenic compounds, in the presence of free radical-liberating initiators, e.g., peroxides, the azo initiators of Hunt U.S. 2,471,959, redox initiators, e.g., sulfite persulfate, etc. to polymeric materials useful in the manufacture of films, coating compositions, and adhesives. Thus, 3-(2-cyanoethyl)-2-methyl-1,3-butadiene can be polymerized in aqueous emulsion in the presence of potassium persulfate at a temperature of 40–50° C. The 1,3-dienes of this invention can be copolymerized with a variety of ethylenically unsaturated monomers. For example, 2-methyl-3-(2-carbomethoxyethyl)-1,3-butadiene and 2-methyl-3-(2-cyanopropyl)-1,3-butadiene can be copolymerized with acrylonitrile, methyl methacrylate, styrene, butadiene, chloroprene, and the like, to give copolymers useful in various applications, e.g., in the formation of films, coating compositions, and the like. More particularly, polymers and copolymers of 2-methyl-3-(2-cyanopropyl)-1,3-butadiene and 2-methyl-3-(2-carbomethoxyethyl)-1,3-butadiene can be dissolved in hydrocarbon solvents, e.g., xylene, or in a mixture of hydrocarbons with alcohols, e.g., ethyl alcohol, ketones, e.g., acetone, esters, e.g., ethyl acetate, or ethers, e.g., dioxane, to form liquid coating compositions useful for coating wood or metal surfaces. The 1,3-dienes of this invention are of use in the manufacture of "made-in-place" rubber. Thus, a small proportion of 2-methyl-3-(2-cyanoethyl)-1,3-butadiene can be copolymerized with 1,3-butadiene to form a low molecular weight polymer having an average of two nitrile groups in each polymer chain. The nitrile groups in this copolymer can then be reduced, e.g., with lithium aluminum hydride in ether solution, to amino groups, and the resulting polymeric amine can be condensed with a dicarboxylic acid, e.g., adipic acid, to form a rubbery polyamide. Homopolymers of the cyanoalkyl-1,3-dienes of this invention can also be reduced with lithium aluminum hydride to basic polymeric amines, which are useful in the form of films, as ion exchange films.

The 1,3-dienes of this invention are also useful as chemical intermediates. Thus, the monomeric cyanoalkyl dienes undergo Diels-Alder additions with ethylenic compounds, e.g., maleic anhydride, as described in Examples I and IV. The resulting polyfunctional cyclohexenes having two carboxylic functions can be condensed with complementary difunctional reactants, e.g., ethylene glycol and/or other glycols or polyhydric alcohols, and/or hexamethylenediamine, and/or other diamines or polyamines, to form condensation polymers that are useful in the form of films, fibers and coating compositions.

The foregoing detailed description has been given for clearness of understanding only and no unnecessary limitations are to be understood therefrom. The invention is not limited to the exact details shown and described for obvious modifications will occur to those skilled in the art.

I claim:

The embodiments of the invention in which an exclusive property or privilege is claimed are defined as follows:

1. A 1,3-diene of the formula

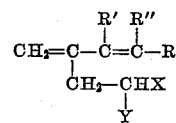

wherein R and R'' are selected from the class consisting of hydrogen and alkyl groups and total not more than five carbons, R' is selected from the class consisting of hydrogen and alkyl groups of up to six carbons, X is selected from the class consisting of the cyano (—CN), and carbomethoxy (—CO₂CH₃) groups and Y is selected from the class consisting of R', phenyl, and X.

2. A 1,3-diene having a terminal methylene (CH₂) group, having on the carbon doubly bonded to said methylene group an ethyl group which has two hydrogens on the α-carbon and at least one hydrogen on the β-carbon, has on its β-carbon from one to two cyano (—CN) groups, any remaining substituent on the β-carbon being saturated aliphatic hydrocarbon of up to six carbons, any substituents on the other terminal carbon of the butadiene being alkyl and totalling up to five carbons, and any remaining substituent on butadiene chain carbon being alkyl of up to six carbons.

3. A 1,3-butadiene having both terminal carbons unsubstituted, having one of the remaining two carbons substituted with an alkyl group of up to six carbons and having on the remaining carbon a β-cyanoalkyl group of not more than nine carbons.

4. 2-methyl-3-(2-cyanoethyl)-1,3-butadiene.

5. 2-methyl-3-(2-cyanopropyl)-1,3-butadiene.

6. The process for the preparation of the 1,3-dienes of claim 1 which comprises pyrolyzing, at 550–850° C. and preferably 600–700° C. at a pressure of up to one atmosphere and preferably at 1–50 mm. mercury, a methylenecyclobutane of the formula

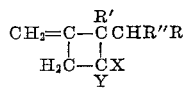

wherein R' is selected from the group consisting of hydrogen and alkyl groups of up to six carbons, R and R" are selected from the group consisting of hydrogen and alkyl groups, the total of R and R" being up to five carbons, X is selected from the class consisting of cyano and carbomethoxy and Y is selected from the class consisting of R', phenyl, and X.

7. The process of claim 6 wherein the reaction pressure is up to one atmosphere and preferably between 300 mm. and one atmosphere and the methylenecyclobutane is formed in situ from a mixture of the following precursors: (a) an allene

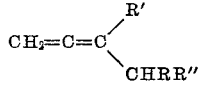

wherein R, R', and R" are as in claim 6, and (b) a vinylidene compound $H_2C=CXY$ wherein X and Y are as in claim 6.

8. Process for the preparation of cyano compounds which comprises pyrolyzing, at a temperature of 600–700° C. and a pressure of 1–50 mm. mercury, a methylenecyclobutane having only hydrogen on the 2-carbon, having on the 3-carbon from one to two cyano groups, having on the 4-carbon an alkyl group of up to six carbons with hydrogen on its α-carbon and having any remaining substituent on the cyclobutane ring an alkyl group of up to six carbons.

9. The process of claim 8 wherein the reaction pressure is between 300 mm. and one atmosphere and the methylenecyclobutane is formed in situ from a mixture of the following precursors: (a) an allene having only one allene carbon substituted and that by not more than two alkyl groups of up to six carbons, one of said alkyl groups having hydrogen on α-carbon, and (b) a vinylidene compound wherein a methylene group is doubly bonded to carbon bearing at least one cyano group, any remaining substituent on said cyano bearing carbon being alkyl of up to six carbons.

10. Process for the preparation of cyano compounds which comprises pyrolyzing, at a temperature of 600–700° C. and a pressure of 1–50 mm. mercury, a 1-methylene-3-cyanocyclobutane having the 4-carbon unsubstituted, and having any remaining substituent on the cyclobutane ring an alkyl group of up to six carbons, there being, on the 2-carbon, an alkyl group of up to six carbons and with hydrogen on its α-carbon.

11. A polymer of the diene of claim 1.
12. A polymer of the diene of claim 2.
13. A polymer of the diene of claim 3.

References Cited in the file of this patent

UNITED STATES PATENTS

| | | |
|---|---|---|
| 2,587,558 | Westfahl et al. | Feb. 26, 1952 |
| 2,664,449 | Miller | Dec. 29, 1953 |
| 2,754,323 | Anderson | July 10, 1956 |
| 2,773,857 | Pratt | Dec. 11, 1956 |